United States Patent
Xu et al.

(10) Patent No.: US 10,397,500 B1
(45) Date of Patent: Aug. 27, 2019

(54) WIDE DYNAMIC RANGE IMAGE SENSOR PIXEL CELL

(71) Applicant: SmartSens Technology (Cayman) Co., Limited., Shanghai (CN)

(72) Inventors: Chen Xu, Shanghai (CN); Yaowu Mo, Shanghai (CN); Zexu Shao, Shanghai (CN); Zhengmin Zhang, Shanghai (CN); Weijian Ma, Shanghai (CN)

(73) Assignee: SmartSens Technology (Cayman) Co. Limited (CN)

( * ) Notice: Subject to any disclaimer, the term of this patent is extended or adjusted under 35 U.S.C. 154(b) by 0 days.

(21) Appl. No.: 16/028,769

(22) Filed: Jul. 6, 2018

(30) Foreign Application Priority Data

Mar. 1, 2018  (CN) .......................... 2018 1 0173062

(51) Int. Cl.
*H04N 5/355* (2011.01)
*H04N 5/3745* (2011.01)

(52) U.S. Cl.
CPC ....... *H04N 5/35563* (2013.01); *H04N 5/3559* (2013.01); *H04N 5/37457* (2013.01)

(58) Field of Classification Search
CPC ............. H04N 5/35563; H04N 5/3559; H04N 5/37457
See application file for complete search history.

(56) References Cited

U.S. PATENT DOCUMENTS

| | | | |
|---|---|---|---|
| 6,731,335 | B1 | 5/2004 | Kim et al. |
| 9,596,423 | B1 | 3/2017 | Molgaard |
| 9,686,485 | B2 | 6/2017 | Agranov et al. |
| 2015/0054992 | A1* | 2/2015 | Luo .................... H04N 5/35563 348/262 |
| 2017/0244921 | A1* | 8/2017 | Velichko ........... H01L 27/14627 |
| 2017/0347047 | A1* | 11/2017 | Mao .................. H01L 27/14612 |
| 2018/0115727 | A1* | 4/2018 | Yanagita ............ H04N 5/35563 |
| 2019/0014276 | A1* | 1/2019 | Cheung .................. H04N 5/378 |

OTHER PUBLICATIONS

Yannick De Wit, Tomas Geurts; Title: A Low Noise Low Power Global Shutter CMOS Pixel Having Capability and Good Shutter Efficiency; Date: Unknown; pp. 1-4; Pub: Belgium.

* cited by examiner

*Primary Examiner* — Daniel M Pasiewicz
(74) *Attorney, Agent, or Firm* — Eric Karich; Karich & Associates (57) ABSTRACT

A pixel cell has a large and small photodiode, transfer transistors, a reset transistor, a dynamic range enhancement capacitor, a capacitor control transistor, a storage capacitor, a storage capacitor control transistor, an amplifier transistor in a source follower configuration and a rolling shutter row select transistor and a readout circuit block. The small and large photodiodes are exposed simultaneously, the large photodiode having a constant exposure while the small photodiode has a chopped exposure and charge transfer to a storage capacitor.

10 Claims, 5 Drawing Sheets

WIDE DYNAMIC RANGE IMAGE SENSOR PIXEL CELL

BACKGROUND OF THE INVENTION

Field of the Invention

This invention relates generally to image sensors, and more particularly to CMOS image sensors. The present invention provides a pixel cell design and method for obtaining wide dynamic range images. An image sensor comprising the invented pixel design and method may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has come with the loss of pixel photosensitivity and dynamic range which require new approaches in order to mitigate.

With the decreased pixel size, the total light absorption depth within the substrate becomes insufficient for some light, especially long-wavelength light. This becomes a particular problem for image sensors using backside illumination (BSI) technology wherein the image light is incident upon the backside of the sensor substrate. In BSI technology the sensor Silicon substrate may be only two microns (micrometers) thick which is adequate to absorb blue light but very inadequate to absorb red light which may require ten microns of thickness to be fully absorbed.

Two of the most common methods for reading off the image signals generated on a sensor chip are the rolling shutter mode and the global shutter mode. The rolling shutter mode involves exposing different lines of the sensor array at different times and reading out those lines in a chosen sequence. The global shutter mode involves exposing each pixel simultaneously and for the same length of time similar to how a mechanical shutter operates on a legacy "snapshot" camera. Prior art digital imaging systems have utilized either rolling shutter or global shutter readout modes. There are advantages however to having an imaging system which is capable of both readout modes wherein the readout mode is selectable by the operator.

Rolling shutter (RS) mode exposes and reads out adjacent rows of the array at different times, that is, each row will start and end its exposure slightly offset in time from its neighbor. The readout of each row follows along each row after the exposure has been completed and transfers the charge from each row into the readout node of the pixel. Although each row is subject to the same exposure time, the row at the top will have ended its exposure a certain time prior to the end of the exposure of the bottom row of the sensor. That time depends on the number of rows and the offset in time between adjacent rows. A potential disadvantage of rolling shutter readout mode is spatial distortion which results from the above. The distortion becomes more apparent in cases where larger objects are moving at a rate that is faster than the readout rate. Another disadvantage is that different regions of the exposed image will not be precisely correlated in time and appear as a distortion in the image. To improve signal to noise in the image signal final readout, specifically to reduce temporal dark noise, a reference readout called correlated double sampling (CDS) is performed prior to the conversion of each pixel charge to an output signal by an amplifier transistor. The amplifier transistor may typically be a transistor in a source-follower (SF) or common drain configuration wherein the pixel employs a voltage mode readout. However, there are advantages to incorporating a common source amplifier wherein the pixel employs a current mode readout. The common source amplifier may be used in large area imagers. The current of the photodiode is amplified and the readout circuits integrate the current on a capacitor to a voltage, which is then converted to the digital domain.

Global shutter (GS) mode exposes all pixels of the array simultaneously. This facilitates the capture of fast moving events, freezing them in time. Before the exposure begins all the pixels are reset (RST) to the same ostensibly dark level by draining all their charge. At the start of the exposure each pixel begins simultaneously to collect charge and is allowed to do so for the duration of the exposure time. At the end of the exposure each pixel transfers charge simultaneously to its readout node. Global shutter mode can be configured to operate in a continuous manner whereby an exposure can proceed while the previous exposure is being readout from the readout storage nodes of each pixel. In this mode the sensor has 100% duty cycle which optimizes time resolution and photon collection efficiency. There is no artifact in the image of the period of transient readout that occurs in rolling shutter mode. Global shutter can be regarded as essential when exact time correlation is required between different regions of the sensor area. Global shutter is also very simple to synchronize with light sources or other devices.

Global shutter mode demands that a pixel contain at least one more transistor or storage component than a pixel using rolling shutter mode. Those extra components are used to store the image charge for readout during the time period following simultaneous exposure. Again in order to improve signal to noise in the image signal a reference readout is required not only to be performed prior to the conversion of each pixel charge to an output signal by an amplifier transistor but also prior to the transfer of the pixel charge to the extra components of the pixel used to store the image charge during readout.

In summary, rolling shutter can deliver the lowest read noise and is useful for very fast streaming of data without synchronization to light sources or peripheral devices. However it carries risk of spatial distortion especially when imaging relatively large, fast moving objects. There is no risk of spatial distortion when using global shutter and when synchronizing to fast switching peripheral devices it is relatively simple and can result in faster frame rates. Flexibility to offer both rolling shutter and global shutter can be very advantageous.

Whether rolling shutter readout or global shutter readout is employed it is possible for CMOS image sensors to periodically miss sampling part of an imaging signal wherein the scene includes, for example, LED illumination due to the LED being operated in Pulse Width Modulation (PWM) mode. The effect is that light from LED bulbs as seen in a camera's output appears to be oscillating between ON and OFF levels including partially ON where only one color may appear. This effect is commonly known as "flicker" and may limit imaging in applications such as LED automotive lights, road signs, and traffic signs as well as in security and surveillance. Flicker avoidance is more challenging when employing high dynamic range (HDR) imaging systems to capture scenes with some very bright regions and some very dark regions while maintaining high image quality in low light conditions. A number of approaches have been introduced in order to expand image sensor dynamic range while keeping low light image quality. Among these approaches, the multiple exposure high dynamic range (ME-HDR) approach is among the most common schemes, where images with different exposure times are captured and then merged into a high dynamic range image. However, this approach has fundamental issues associated with the different exposure timings for long and short exposures, which can generate artifacts against moving objects or time-varying light sources like pulsed LEDs. A second common approach uses two kinds of pixel—one with lower sensitivity, and the other with higher sensitivity—implemented in the same pixel array, and the different sensitivity signals combined into a linear signal.

Another advanced dynamic range enhancement technique may employ a well capacity adjusting scheme. In this scheme, the well capacity is increased one or more times during the time period in which the photodiode charge is being transferred to the floating diode. The employment of such a dynamic range enhancement scheme in the context of an image sensor pixel comprised of a small and large photodiode is a key element of the invention described herein. The dynamic range enhancement scheme employed in the embodiments of the invention involves constructing a well capacity adjusting circuit by adding a capacitor and a capacitor control transistor in an electrically parallel configuration with the floating drain on the pixel cell. By coupling the additional capacitor to the floating drain the photodiode charge is transferred to a larger capacitance resulting in a lower conversion gain and the ability to accommodate more charge before saturation. This ability is employed while scenes with high light intensity are being imaged and not while scenes with normal and low light intensity are being imaged.

An opportunity for improvement of image sensors arises when certain components are employed to enhance their ability to adequately image both high lights and dark shadows in a scene while maintaining high image quality. The present invention fulfills these needs and provides further advantages as described in the following summary.

SUMMARY OF THE INVENTION

The present invention teaches certain benefits in construction and use which give rise to the objectives described below.

A pixel cell and readout method comprise a single exposure high dynamic range (SEHDR) imaging system which mitigates the artifacts from moving objects or time-varying light sources while providing high image quality under low light. Each pixel includes a combination of two photodiodes. One of the photodiodes can be used to sense bright light conditions while another photodiode can be used to sense low light conditions. In this approach, the photodiode used to sense bright light is smaller (having a smaller light exposure area) than the photodiode used to sense low light conditions. The smaller photodiode is exposed to incident light in a chopped manner while the larger photodiode is exposed at a constant manner. Each pixel cell also employs dual conversion gain and shuttered exposure to enhance signal dynamic range. The unique construction of the pixel cell provides the option to read out the low light photodiode to be read out in rolling shutter mode while the high light photodiode may be read out in global shutter mode or chopped rolling shutter mode.

A primary objective of the present invention is to provide an image sensor pixel having advantages not taught by the prior art.

Another objective is to provide a pixel cell that has the ability to adequately image both high lights and dark shadows in a scene while maintaining high image quality.

An additional objective of the present is to provide a pixel cell having readout modes selectable between rolling shutter and global shutter through the use of computer programmable digital register settings.

A further objective of the present invention is to provide a Quad-Conversion gain pixel cell wherein a dynamic range enhancement capacitor and a capacitor control transistor are employed along with a low light sensitivity photodiode and a high light sensitivity photodiode in order to enhance signal dynamic range.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor pixel cell with signal dynamic range enhancement components. Various embodiments of the image sensor pixel cell are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects. A substrate may have a front side and a back side. Any fabrication process that is performed from the front side may be referred to as a frontside process while any fabrication process that is performed from the back side may be referred to as a backside process. Structures and devices such as photodiodes and associated transistors may be formed in a front surface of a substrate. A dielectric stack that includes alternating layers of metal routing layers and conductive via layers may be formed on the front surface of a substrate.

The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). In the present invention of a stacked chip arrangement the front sides of two chips may be directly connected since the electrical interconnects on each chip will most commonly be formed on the front sides of each chip. When reference is made to certain circuit elements residing within or formed in a substrate this is generally accepted to mean the circuits reside on the front side of the substrate.

Figure 1:
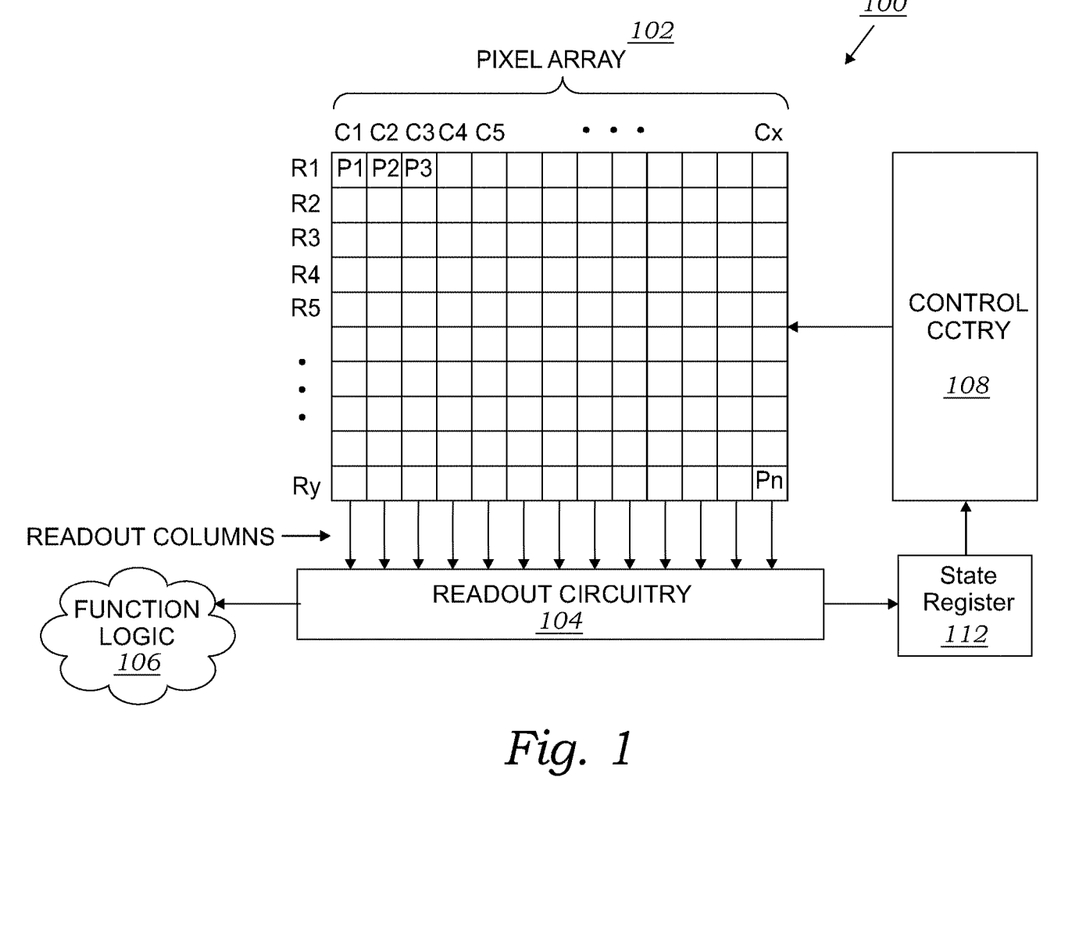
FIG. 1 is a diagram illustrating one example of an imaging system including a pixel array having image sensor pixel cells included in an integrated circuit system according to one embodiment of the present invention.

FIG. 1 is a diagram illustrating one example of an imaging system 100 including an example pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 112. In one example, pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 112 and then transferred to function logic 106. In various examples, readout circuitry 104 may include amplification circuitry, analog-to-digital (ADC) conversion circuitry, or otherwise. State register 112 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated) or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
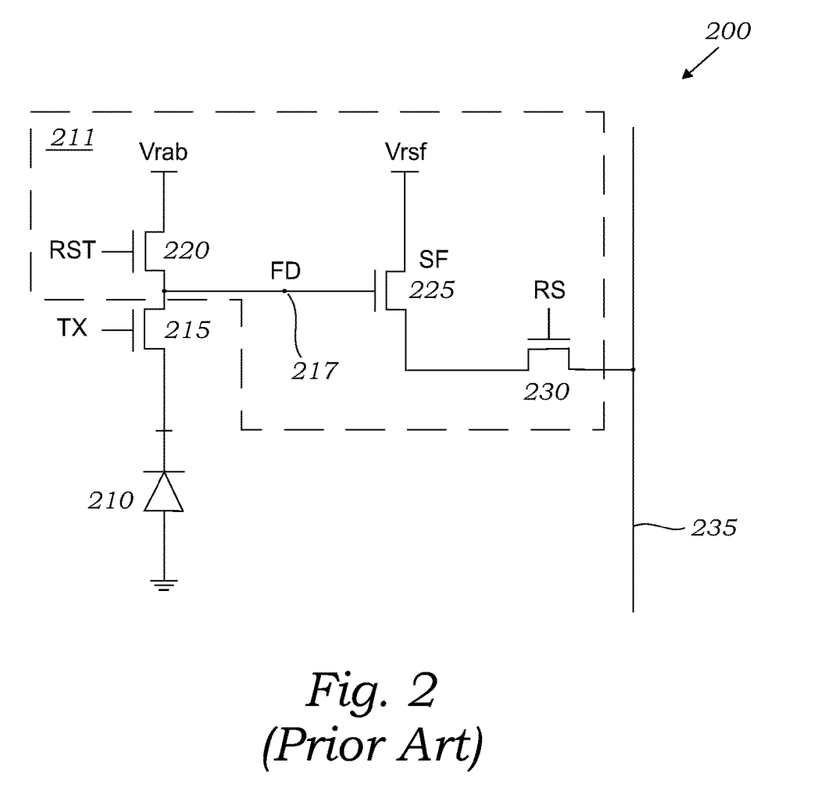
FIG. 2 is an electrical schematic that illustrates one example of an image sensor pixel cell with rolling shutter readout found in the prior art.

FIG. 2 is an electrical schematic that illustrates one example of an image sensor pixel cell 200 with rolling shutter readout found in the prior art. This figure and example pixel are provided to simplify explanation of pixel operation in anticipation of a description of an example of the present invention. Each sensor pixel 200 includes a photodiode 210 (e.g., photosensitive element) and pixel support circuitry 211 as shown. Photodiode 210 may be a "pinned" photodiode as is commonly present in CMOS image sensors. Photodiode 210 may be disposed on a sensor chip of a stacked die system, while pixel support circuitry 211 may be disposed on a separate circuit chip. In one example, pixel support circuitry 211 includes a reset transistor 220, source follower (SF) amplifier transistor 225, and row select transistor 230 on a circuit chip coupled to a transfer transistor 215 and photodiode 210 on a sensor chip of a stacked die system as shown. An amplifier transistor in a source follower configuration is one in which the signal is input on the gate electrode and taken out on the source electrode. In another example, not shown, pixel support circuitry includes row select transistor 230 on a circuit chip coupled to a reset transistor 220, source follower (SF) transistor 225, transfer transistor 215 and photodiode 210 on a sensor chip of a stacked die system. During operation, photosensitive element 210 photo-generates charge in response to incident light during an exposure period. Transfer transistor 215 is coupled to receive a transfer signal TX, which causes transfer transistor 215 to transfer the charge accumulated in photodiode 210 to floating diffusion (FD) node 217. Floating diffusion 217 is in effect the drain of the transfer transistor while the photodiode is the source of transfer transistor 215. In one embodiment transfer transistor is a metal-oxide semiconductor field-effect transistor (MOSFET). Reset transistor 220 is coupled between power rail VDD and floating diffusion node 217 to reset sensor pixel 200 (e.g., discharge or charge floating diffusion node 217 and photodiode 210 to a preset voltage) in response to a reset signal RST. Floating diffusion node 217 is coupled to control the gate terminal of source-follower transistor 225. Source-follower transistor 225 is coupled between power rail VDD and row select transistor 230 to amplify a signal responsive to the charge on the floating diffusion FD node 217. Row select transistor 230 couples the output of pixel circuitry from the source-follower transistor 225 to the readout column, or bit line 235, in response to a row select signal RS. Photodiode 210 and floating diffusion node 217 are reset by temporarily asserting or enabling the reset signal RST and transfer signal TX. The accumulation period or accumulating window (e.g., exposure period) begins when the transfer signal TX is disabled, which permits incident light to photo-generate charge in photodiode 210. As photo-generated electrons accumulate in photodiode 210, its voltage decreases (electrons are negative charge carriers). The voltage or charge on photodiode 210 is representative of the intensity of the light incident on photodiode 210 during the exposure period. At the end of the exposure period, the reset signal RST is disabled, which turns off the reset transistor 220 and isolates floating diffusion FD node 217 from VDD. The transfer signal TX is then enabled to couple photodiode 210 to floating diffusion node 217. The charge is transferred from photodiode 210 to the floating diffusion FD node 217 through transfer transistor 215, which causes the voltage of floating diffusion FD node 217 to drop by an amount proportional to photo-generated electrons accumulated on photodiode 210 during the exposure period. The accumulation period or exposure window actually ends when the transfer transistor is disabled since the photodiode is actually still accumulating charge while the transfer transistor is enabled and transferring charge to the floating diffusion.

An important design metric in image sensors is dynamic range, which is defined as the logarithmic ratio between the largest non-saturating photocurrent and the smallest detectable photocurrent. For a sensor with a fixed saturation charge, also referred to as well capacity, saturation limits the highest signal. Generally, the smallest detectable photocurrent is dominated by reset sampling noise of the photodiode and the floating diffusion. Efforts to reduce the impact of reset sampling noise on dynamic range have relied on correlated double sampling (CDS). CDS is a technique of taking two samples of a signal out of the pixel and subtracting the first from the second to remove reset sampling noise. Generally, the sampling is performed once immediately following reset of the photodiode and floating diffusion and once after the photodiode has been allowed to accumulate charge and transfer it to the floating diffusion. The subtraction is typically performed in peripheral circuitry outside of the pixel and may increase conventional image sensor area although it may not increase pixel area. An image sensor utilizing a rolling shutter readout mode may incorporate CDS with only added peripheral circuit elements and no additional circuit elements in the pixel. An image sensor utilizing global shutter however may require multiple capacitors and transistors inside the pixel which decreases the fill factor. It is advantageous to maintain reduced fill factor by partitioning the additional components required for CDS on to a circuit chip separate from and stacked on top of a sensor chip.

Figure 3:
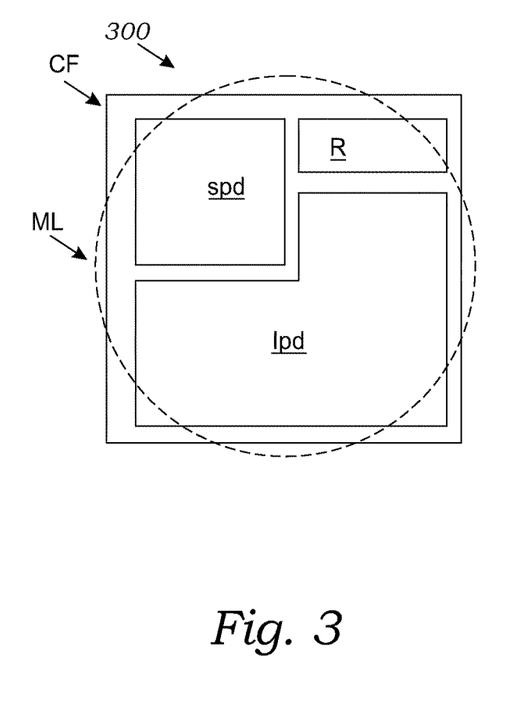
FIG. 3 is a diagram illustrating a pixel cell layout wherein a small photodiode and a large photodiode share a common color filter and microlens.

FIG. 3 is a diagram illustrating a pixel cell 300 wherein a small photodiode spd and a large photodiode lpd share a common color filter CF and microlens ML. As shown in FIG. 3, in the pixel cell 300, the small photodiode spd and the large photodiode lpd may also share a common read out circuit R. The small photodiode spd provides a means to sense bright light from an object being imaged while large photodiode lpd provides a means to sense dim light. Since the two photodiodes share the same color filter CF and microlens ML, they effectively sample the same point in the image. Photodiodes spd and lpd may have various relative sizes and be placed in various positions within the pixel cell. Typically the sizes and placements of the photodiodes within pixel cell portion 300 are chosen such that an array of pixel cell portions 300 will result in all of the photodiodes of the assembled array fall on a uniform grid. In the instance pixel cell 300 is employed to form a color image sensor, light filters of various colors may be placed at each pixel location within the incident light path. A commonly known two by two arrangement of light filters is a Bayer filter pattern which consists of a red, a blue and two green filters (RGGB). Pixel circuitry residing on pixel cell portion 300 is constrained to occupy no more area than that occupied by pixel cell portion 300.

Pixel cell 300 illustrates only the pixel related components residing on an image sensor. Pixel cell 300 is repeated to form the rows and columns of an imaging array. An image sensor may contain additional peripheral circuits as need to functionalize the imaging array portion of the image sensor, for example, electrical wiring to carry reset and transfer transistor gate electrode control signals to all the pixel cells. An image sensor also includes readout circuitry capable of providing a global shutter readout function when a global shutter readout mode is selected and may also contain additional peripheral circuits as needed to functionalize the pixel circuitry of the image sensor, for example, electrical wiring to carry control signals and power.

Figure 4:
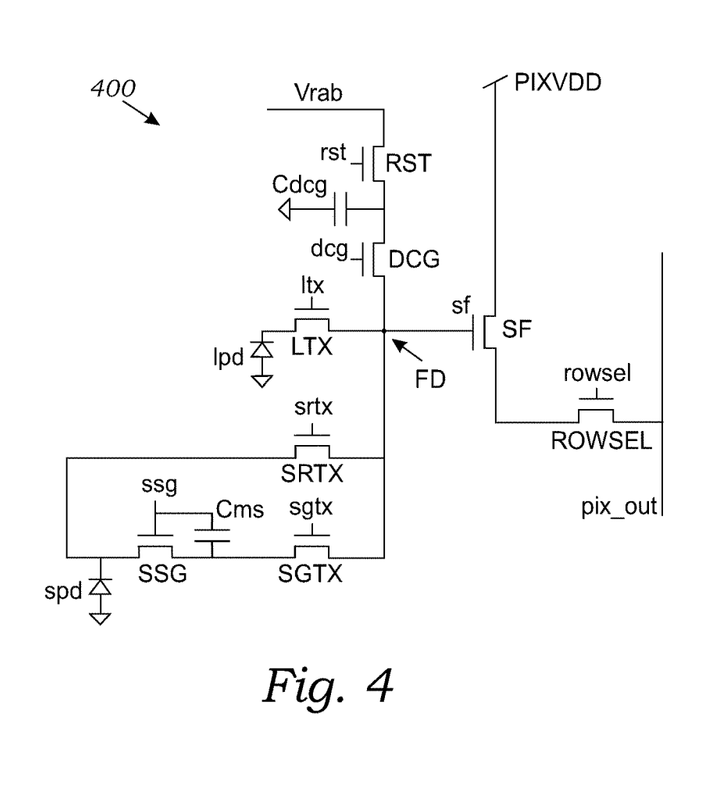
FIG. 4 is an electrical schematic diagram of a pixel cell in accordance with a first embodiment of the invention.

FIG. 4 is an electrical schematic diagram of a pixel cell 400 in accordance with a first embodiment of the invention. As shown in FIG. 4, the pixel cell 400 comprising several signal dynamic range enhancing features which can be made to work together inventively to provide wide dynamic range. FIG. 4 illustrates pixel cell 400 wherein small photodiode spd and large photodiode lpd share a common readout circuit which includes, in part, amplifier transistor SF and row select transistor ROWSEL. Pixel cell 400 also includes Double Conversion Gain capability as provided by dynamic range enhancement capacitor Cdcg and capacitor control transistor DCG as well as global shutter readout capability for small photodiode spd as provided by storage gate transfer transistor SGTX and capacitor Cms. Large photodiode lpd has associated transfer transistor LTX coupling it to floating drain FD while small photodiode spd has associated transfer transistor SSG coupling it through the global shutter related elements to floating drain FD. Small photodiode spd also has associated transistor SRTX directly connecting it to floating drain FD. Pixel cell 400 has several operating mode options which may be employed as standalone modes or combined to provide wide dynamic range to the signal readout of image charge accumulated in the two photodiodes and the storage elements. In a first embodiment of the invention the Double Conversion Gain capability is combined with simultaneous exposure of the large and small photodiodes. The first embodiment of the invention also incorporates chopped exposure of the small photodiode while the large photodiode is under simultaneous constant exposure and a rolling shutter readout.

Figure 5:
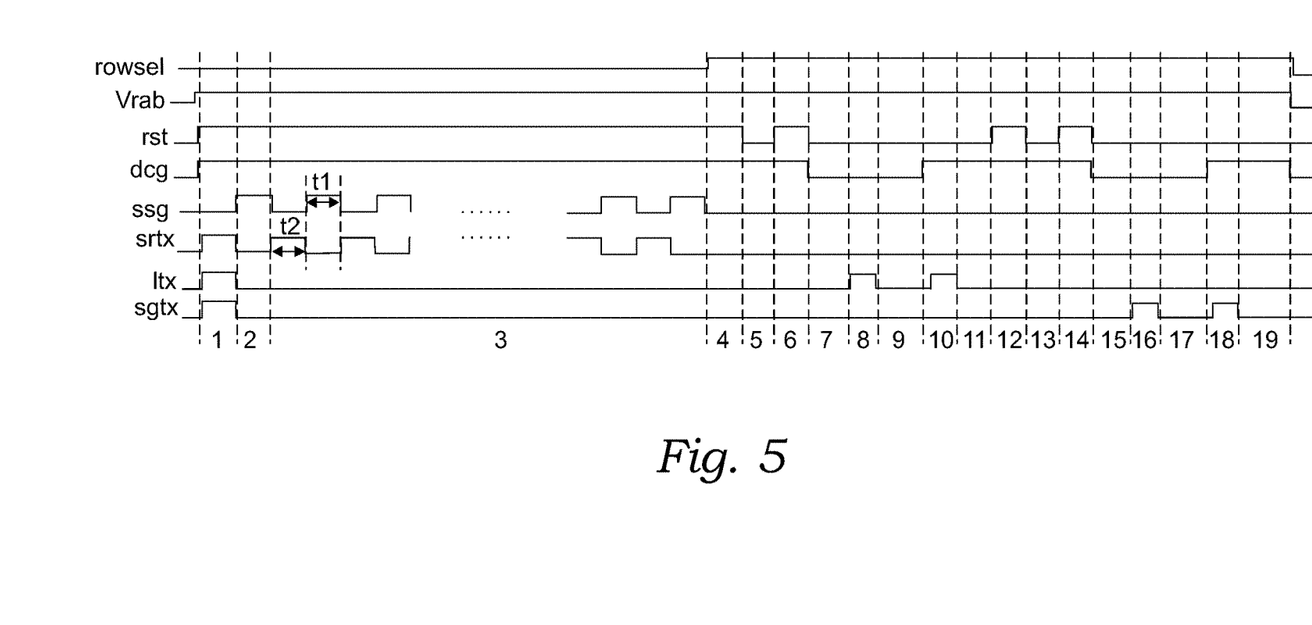
FIG. 5 is a control timing diagram illustrating control signal timing that may be used to execute a selected readout mode of the pixel cell illustrated in FIG. 4 and in accordance with a first embodiment of the invention.

FIG. 5 is a control timing diagram illustrating control signal timing that may be used to execute a selected readout mode of the pixel cell illustrated in FIG. 4 and in accordance with the first embodiment of the invention. Illustrated in FIG. 5 are control signals rowsel applied to transistor ROWSEL, Vrab and rst applied to the drain and gate of reset transistor RST respectively, dcg applied to transistor DCG, ssg applied to transistor SSG, srtx applied to transistor STRX, ltx applied to transistor LTX, and sgtx applied to transistor SGTX. FIG. 5 illustrates 19 consecutive steps or intervals which accomplish the readout of one row of pixel cells in an array representative of the first embodiment of the invention. Prior to step 1 all of the 8 control signals are in their low or off state and so too are the transistors they directly control or provide a bias to. During step 1 rowsel is low preventing any signal readout, Vrab is set high to provide a reset voltage to the drain of transistor RST for which control signal rst is set high to pass a voltage level near Vrab to transistor DCG. Control signals dcg, ltx, sgtx, srtx are set high while ssg is set low in order to initialize the photodiodes, their common FD node and connection nodes to a reference high state near Vrab. During step 2 rowsel, Vrab, rst and dcg remain as they were during step 1 while ltx, srtx and sgtx to isolate the large and small photodiodes and begin their simultaneous exposure periods wherein they accumulate charge at rates determined by their incident light intensity. Also during step 2 control signal ssg is set high to turn on transistor SSG briefly which equalizes the voltage levels on the small photodiode spd and the capacitor Cms, which lies across the gate and drain electrodes of transistor SSG. During step 3 the simultaneous exposure or charge accumulation period for both small and large photodiodes continues as initiated at step 2 except that for small photodiode spd the accumulated charge is alternately transferred during accumulation and stopped and reset to a voltage near Vrab. This is illustrated in FIG. 5 during the step labeled 3 by control signal ssg being set low to stop the transfer of charge accumulating on small photodiode spd and at the same time and for the same duration control signal srtx being set high to reset the photodiode to a voltage near Vrab. The time duration t2 indicates how long ssg is low and srtx is high. Immediately following the first time interval t2 of step 3 small photodiode spd is allowed to accumulate and transfer charge to capacitor Cms by virtue of control signal ssg being set high and control signal srtx being set low to isolate small photodiode spd from the reset voltage supply. The time duration t1 indicates how long ssg is set high and srtx is set low. This procedure of resetting small photodiode spd for a time t2 and accumulating and transferring charge from small photodiode spd to capacitor Cms for a time t1 is repeated a number of times during step 3 and comprises a chopping of the period of charge accumulation and transfer of the charge collected on small photodiode spd at a rate determined by setting time durations t1 and t2 according to the design requirements of a specific imaging application. A cycle of the chopped exposure of the small photodiode consists of a time t1 plus t2. A key inventive feature of the first embodiment of the invention is to operate large photodiode lpd in a constant exposure and charge collection mode over a period during which small photodiode spd is simultaneously operated in a chopped exposure and charge collection mode.

As illustrated in FIG. 5 during the step labeled 4 the period of chopped exposure of small photodiode spd ceases by virtue of both control signal ssg and srtx being set low. Also during step 4 control signals rst and dcg remain high, which maintains floating drain FD at the reset potential, and control signal rowsel is set to high which enables the reset FD signal level to be read out as a reference value at pix out. The only changes to the control signals during steps 5 and 6 are that rst is set low during step 5 enabling a reference level for the initial state of capacitor Cdcg combined with floating drain FD, the Low Conversion Gain (LCG) state, to be read out at pix out during step 5 and then rst is set high during step 6 to once again enable the reset FD signal level to be read out. During step 7 the only changes to the control signals are that rst and ssg are both set low which enables a reference level for the initial state of the FD alone, the High Conversion Gain (HCG) state, to be read out at pix out.

A first image charge related signal is read out during steps 8 and 9. The only control signal that is changed during steps 8 and 9 is ltx. During step 8 control signal ltx is set high to turn on transfer transistor LTX and allow the charge accumulated in large photodiode lpd to be transferred through transfer transistor LTX on to floating drain FD. During step 9 control signal ltx is set low to isolate lpd from FD and enable the imaging signal related to the charge accumulated on lpd to be read out at pix out. Since control signal dcg remains low during steps 8 and 9 the signal read out from lpd is the High Conversion Gain (HCG) signal related to the exposure of large photodiode lpd. This first readout method is a High Conversion Gain mode of readout of photodiode lpd. A second image charge related signal is read out during steps 10 and 11. The only control signals that are changed during steps 10 and 11 are dcg and ltx. During step 10 control signal dcg is set high to enable the capacitance of capacitor Cdcg to be added to the capacitance of floating drain FD and control signal ltx is also set high to transfer any remaining charge from lpd on to the combined capacitance of Cdcg and FD. During step 11 control signal ltx is returned to a low level and the signal then read out from lpd is the Low Conversion Gain (LCG) signal related to the exposure of large photodiode lpd. This second readout method is a Low Conversion Gain mode of readout of photodiode lpd. The aforementioned signal timing and signal readouts accomplish the sampling of the imaging signal from large photodiode lpd in both a HCG and LCG mode along with their related reference levels.

A third and fourth image charge related signal is read out during steps 12 through 19. These signals are derived from the exposure of small photodiode spd. During steps 12, 13 and 14 the only control signal to change relative to its state during step 11 is control signal rst. Control signal rst is set to a high level during step 12, which resets floating drain FD, then rst is set low during step 13 during which an initial reference image signal is read out at pix out, and then rst is set high again during step 14 which again resets floating drain FD. Since control signal dcg remained set to a high level during steps 12 13 and 14 the initial reference image signal read out during step 13 is the Low Conversion Gain (LCG) reference level for the read out of the image signal to be derived from the exposure of small photodiode spd. During steps 15, 16 and 17 control signal rst is set low isolating floating drain FD and control signal dcg is also set low isolating floating drain FD from dynamic range enhancement capacitor Cdcg. During step 15 the initial reference image signal read out is the High Conversion Gain (HCG) reference level for the read out of the image signal to be derived from the exposure of small photodiode spd. Control signal sgtx remains at a low level during step 15 and then set to a high level during step 16 which transfers image related charge accumulated on capacitor Cms as a result of the previous chopped exposures to floating drain FD. During step 17 control signal sgtx is set low and a third image signal, one related to charge collected by small photodiode spd, is read out at pix out. Since dcg was low during steps 15, 16, and 17 the image signal read out during step 17 is the High Conversion Gain (HCG) signal related to small photodiode spd. This third readout method is the High Conversion Gain mode of readout of the charge stored on storage capacitor Cms. During steps 18 and 19 control signal dcg is set to a high level which connects capacitor Cdcg to floating drain FD. Control signal sgtx is set to a high level during step 18 which transfers any remaining charge from capacitor Cms on to floating drain FD and then control signal sgtx is set low during step 19. Since dcg is set high during steps 18 and 19 the image signal read out during step 19 is the Low Conversion Gain (LCG) signal related to small photodiode spd. This fourth readout method is the Low Conversion Gain mode of readout of the charge on storage capacitor Cms. The aforementioned signal timing and signal readouts accomplish the sampling of the imaging signal from small photodiode spd in both a HCG and LCG mode along with their related reference levels.

In summary, as a result of the described circuit diagram of FIG. 4 and the described control signal timing diagram of the first embodiment of the invention four separate signals and their respective reference levels are generated and readout for each pixel cell leading to a widening of the dynamic range of the resultant signal representing the illumination incident upon the dual photodiode pixel. An advantage of the invented pixel cell is that the dual conversion gain components are shared by the large and small photodiodes rather than constrained to have separate dual conversion gain components assigned to each photodiode. The read out methods illustrated in FIG. 5 would be more commonly be used in a row by row rolling shutter readout method for both the large and small photodiodes but the presence of storage elements Cms and SGTX it is to be understood that in another embodiment of the invention the small photodiode may be exposed and read out in a global shutter mode while the large photodiode is read out in a rolling shutter mode. In both cases the multiple signals readout from the invented pixel cell and readout method are combined by additional image processing circuitry which may include programmable circuits and memory elements either embedded in the image sensor array circuit substrate or stacked upon the substrate or situated remotely from the sensor array circuit.

In addition due to the employment of a chopped exposure and transfer of image charge from small photodiode spd to capacitor Cms the signals derived from small photodiode spd have an increased measure of immunity to image intensity flicker. With this invention the detrimental effects of imaging LED sources may be mitigated. In one embodiment of the invention the number of cycles of the chopped exposure of the second photodiode, wherein during period t2 charge is drained from the photodiode and during period t1 charge is accumulated on the photodiode and transferred to the storage capacitor, exceeds three. More generally the frequency of the chopped exposure may be set to avoid a known incident illumination flicker frequency such as may be used in an LED based lamp or display.

Figure 6:
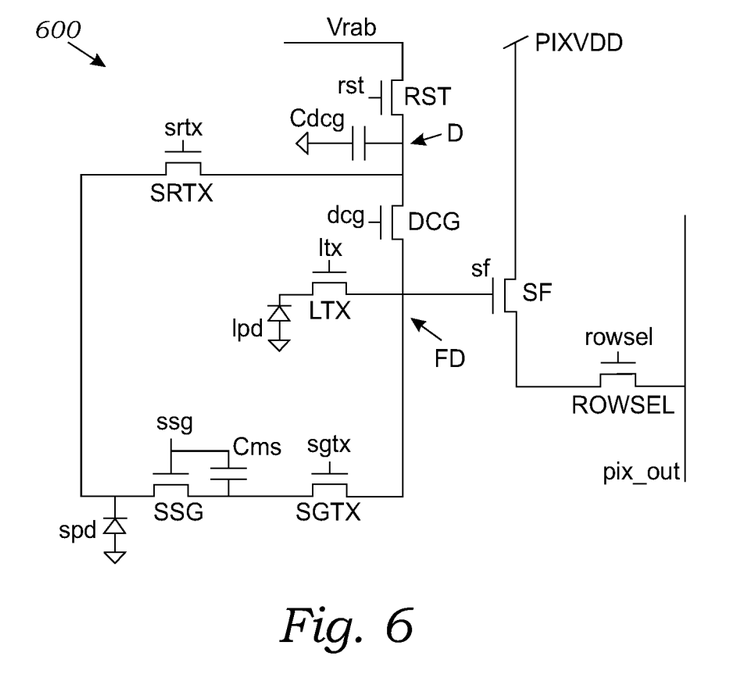
FIG. 6 is an electrical schematic diagram of a pixel cell in accordance with a second embodiment of the invention.

FIG. 6 is an electrical schematic diagram of a pixel cell in accordance with a second embodiment of the invention. FIG. 6 illustrates pixel cell 600 comprising the same signal dynamic range enhancing features shown in FIG. 4 but with an alternative connection scheme. The pixel cell electrical schematic illustrated in FIG. 6 is the same as the one shown in FIG. 4 with the exception that transistor SRTX connects small photodiode spd to node D, the node between dynamic enhancement capacitor Cdcg and capacitor control transistor DCG, rather than at the node between transistor DCG and floating drain FD. A control timing diagram similar to FIG. 5 can be used to read out imaging signals providing enhanced dynamic range.

Further embodiments of the invention may be realized by the choice of fabrication method for capacitors Cdcg and Cms. These capacitors may be fabricated as metal-insulator-metal (MIM) capacitors, metal-oxide-metal (MOM) capacitors or metal-oxide-silicon (MOS) capacitors. There are also embodiments of the invention wherein capacitor Cms comprises the parasitic capacitance between the gate and drain electrodes of transistor SSG and the capacitor Cdcg comprises the junction capacitance of the node between transistors RST and DCG.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An image sensor pixel cell for use in a wide dynamic range image sensor, the image sensor pixel cell comprising:
   a floating drain node which is useful to transform an imaging related charge into an imaging related voltage signal and is directly connected to five components comprising:
   an input gate electrode of an amplifier transistor in a source follower configuration which is useful to couple out the imaging related voltage signal from the floating drain node through a row select transistor to a pixel cell array column line;
   a drain electrode of a first transfer transistor which in turn has a source electrode connected to a first photodiode with low sensitivity to light incident from a scene;
   a source electrode of a double conversion gain control transistor which in turn has a drain electrode connected to a reset transistor and also to a dynamic range enhancement capacitor;
   a drain electrode of a second transfer transistor which in turn has a source electrode connected to a second photodiode with high sensitivity to light incident from a scene in comparison to the first photodiode; and
   a drain electrode of a storage gate transfer transistor which in turn has a source electrode connected to the drain electrode of a third transfer transistor whose source electrode is connected to the first photodiode, wherein a storage capacitor is connected between the gate electrode and drain electrode of the third transfer transistor.

2. The image sensor pixel cell of claim 1, wherein the electrode of the dynamic range enhancement capacitor not connected to the drain of the double conversion gain transistor is connected to ground.

3. The image sensor pixel cell of claim 1, wherein the second photodiode has high sensitivity to light incident from a scene relative to the sensitivity of the first photodiode by virtue of it having a larger area relative to the first photodiode upon which to receive light incident from a scene.

4. The image sensor pixel cell of claim 3, wherein the incident light reception area of the second photodiode is at least twice the incident light reception area of the first photodiode.

5. The image sensor pixel cell of claim 1, wherein the first and second photodiodes share the same microlens and the same color filter element.

6. The image sensor pixel cell of claim 1, wherein the dynamic enhancement capacitor and the storage capacitor are one of a metal-insulator-metal (MIM) capacitor, a metal-oxide-metal (MOM) capacitor, a metal-oxide-silicon (MOS) capacitor, a transistor gate to drain electrode parasitic capacitor, or a diode capacitor.

7. An image sensor pixel cell for use in a wide dynamic range image sensor, the image sensor pixel cell comprising:
a floating drain node which is useful to transform an imaging related charge into an imaging related voltage signal and is directly connected to four components comprising:
an input gate electrode of an amplifier transistor in a source follower configuration which is useful to couple out the imaging related voltage signal from the floating drain node through a row select transistor to a pixel cell array column line;
a drain electrode of a first transfer transistor which in turn has a source electrode connected to a first photodiode with high sensitivity to light incident from a scene;
a source electrode of a double conversion gain control transistor which in turn has a drain electrode connected to a reset transistor and also to a dynamic range enhancement capacitor, wherein the drain electrode of a second transfer transistor is connected to the drain electrode of the double conversion gain transistor and the source of the second transfer transistor is connected to a second photodiode with low sensitivity to light incident from a scene in comparison to the first photodiode; and
a drain electrode of a storage gate transfer transistor which in turn has a source electrode connected to the drain electrode of a third transfer transistor whose source electrode is connected to the second photodiode, wherein a storage capacitor is connected between the gate electrode and drain electrode of the third transfer transistor.

8. The image sensor pixel cell of claim 7, wherein the electrode of the dynamic range enhancement capacitor not connected to the drain of the double conversion gain transistor is connected to ground.

9. A method to achieve wide dynamic range image sensing with the image sensing pixel cell as recited in claim 1 having one charge accumulation period and a sequence of four readout modes comprising the steps of:
resetting all of the components of the pixel cell; and then
simultaneously accumulating charge on the first and second photodiodes during an accumulation period, the charge representative of light incident on the photodiodes from a scene, wherein during the accumulation period the charge accumulating on the first photodiode is allowed to collect without disturbance by keeping the first transfer transistor disabled while the charge accumulating on the second photodiode is chopped by alternately first accumulating and transferring the charge to the storage capacitor during a time interval t1 by enabling the third transfer transistor for a time interval t1 and secondly draining the charge to the reset potential during a time interval t2 by enabling the second transfer transistor for the time interval t2; and next
reading out an imaging related voltage signal on the floating drain related to an imaging related charge transferred from the first photodiode in a High Conversion Gain mode, i.e. the dual conversion gain capacitor is not added to the floating drain; and next
reading out an imaging related voltage signal on the floating drain related to an imaging related charge transferred from the first photodiode in a Low Conversion Gain mode, i.e. the dual conversion gain capacitor is added to the floating drain; and next
reading out an imaging signal related voltage signal on the floating drain related to an imaging related charge transferred from the storage capacitor in a High Conversion Gain mode; and next
reading out an imaging signal voltage signal on the floating drain related to an imaging related charge transferred from the storage capacitor in a Low Conversion Gain mode; and next
combining the four imaging signals to produce a wide dynamic range composite signal representative of the incident light from a location within a scene.

10. The method of claim 9 wherein the number of cycles of the chopped exposure of the second photodiode, wherein during a single cycle charge is accumulated on the photodiode and transferred to the storage capacitor during an interval t1 and then drained from the photodiode during an interval t2, exceeds three.

* * * * *